United States Patent
Yang et al.

(10) Patent No.: US 12,480,292 B2
(45) Date of Patent: Nov. 25, 2025

(54) WATER OUTLET DEVICE

(71) Applicant: Zhangzhou Solex Smart Home Co., Ltd., Fujian (CN)

(72) Inventors: Jianhong Yang, Fujian (CN); Zhenwen Zhao, Fujian (CN); Lihong Hu, Fujian (CN)

(73) Assignee: Zhangzhou Solex Smart Home Co., Ltd., Zhangzhou (CN)

( * ) Notice: Subject to any disclaimer, the term of this patent is extended or adjusted under 35 U.S.C. 154(b) by 317 days.

(21) Appl. No.: 18/301,285

(22) Filed: Apr. 17, 2023

(65) Prior Publication Data
US 2023/0332387 A1    Oct. 19, 2023

(30) Foreign Application Priority Data
Apr. 18, 2022   (CN) .......................... 202210406733.X

(51) Int. Cl.
| | |
|---|---|
| *E03C 1/048* | (2006.01) |
| *E03C 1/02* | (2006.01) |
| *E03C 1/04* | (2006.01) |
| *E03C 1/05* | (2006.01) |

(52) U.S. Cl.
CPC .............. *E03C 1/048* (2013.01); *E03C 1/057* (2013.01); *E03C 2001/026* (2013.01); *E03C 2001/0415* (2013.01)

(58) Field of Classification Search
CPC .......... E03C 1/04; E03C 1/0404; E03C 1/048; E03C 1/05; E03C 1/057; E03C 1/058; E03C 2001/0262; E03C 2001/0415; A61C 17/02; A61C 17/0202; A61C 17/0214

USPC .... 4/518, 625–627, 675–678; 601/162, 165; 433/80

See application file for complete search history.

(56) References Cited

U.S. PATENT DOCUMENTS

| | | | | |
|---|---|---|---|---|
| 3,966,359 | A | * | 6/1976 | Woog ..................... A61C 17/02 601/162 |
| 10,064,710 | B2 | * | 9/2018 | Zhang ................ A61C 17/0202 |
| 2007/0246550 | A1 | * | 10/2007 | Rodenbeck ............ E03C 1/057 236/12.11 |

(Continued)

FOREIGN PATENT DOCUMENTS

| | | |
|---|---|---|
| CN | 205215410 U | 5/2016 |
| CN | 105708574 A | 6/2016 |
| CN | 207562002 U | 7/2018 |

(Continued)

OTHER PUBLICATIONS

2nd Office Action dated Sep. 28, 2022 of Chinese Application No. 202210406733.X.

(Continued)

*Primary Examiner* — Tuan N Nguyen
(74) *Attorney, Agent, or Firm* — Qinghong Xu

(57) ABSTRACT

An embodiment of the present disclosure provides a water outlet device including a first water outlet fixedly mounted on a worktable, a second water outlet detachably connected with the first water outlet or the worktable for an operator to hold, and a control unit for being mounted on the worktable and including a controller and a power source. The power source is electrically connected with the controller for supplying power for the controller. The controller is configured to control opening or closing of the first water outlet and/or the second water outlet.

17 Claims, 9 Drawing Sheets

(56) References Cited

U.S. PATENT DOCUMENTS

2020/0330182 A1      10/2020   Williams et al.
2021/0102362 A1*      4/2021   Rosandich .............. E03C 1/057

FOREIGN PATENT DOCUMENTS

| CN | 108386576  | A |   |  8/2018 |
|----|------------|---|---|---------|
| CN | 208331371  | U |   |  1/2019 |
| CN | 109481056  | A |   |  3/2019 |
| CN | 209332331  | U |   |  9/2019 |
| CN | 209354741  | U |   |  9/2019 |
| CN | 110528634  | A | * | 12/2019 |
| CN | 110873210  | A |   |  3/2020 |
| CN | 210716245  | U |   |  6/2020 |
| CN | 214679066  | U |   | 11/2021 |
| JP |   2968528  | B1 |  | 10/1999 |
| WO | 2022038021 | A1 |  |  2/2022 |

OTHER PUBLICATIONS

1st Office Action dated Apr. 13, 2023 of Chinese Application No. 202210406733.X.

\* cited by examiner

WATER OUTLET DEVICE

CROSS-REFERENCE TO RELATED APPLICATIONS

The present application is based on and claims the benefit of and priority to Chinese Patent Application No. 202210406733.X, filed on Apr. 18, 2022, the entire contents of which being incorporated herein by reference.

TECHNICAL FIELD

Embodiments of the present disclosure relate to the technical field of a water outlet device, and in particular, to a water outlet device in which a fixed water outlet and a hand-held water outlet are detachably combined.

BACKGROUND

In order to help users to select different water outlet devices according to various usage environments, a water outlet device in which various water outlets are combined is proposed in the related art, and at least one hand-held water outlet is generally included in the various water outlets. However, it is inconvenient for the user to use the hand-held water outlet, and then user's experience is affected.

SUMMARY

An embodiment of the present disclosure provides a water outlet device to solve the problem in the related art that it is inconvenient for the user to use a hand-held water outlet.

A water outlet device according to an embodiment of the present disclosure includes a first water outlet, a second water outlet and a control unit. The first water outlet is configured to be fixedly mounted on the worktable. The second water outlet is detachably connected to the first water outlet or the worktable for the operator to hold. The control unit is configured to be mounted on the worktable, and includes a controller and a power supply. The power supply is electrically connected to the controller for supplying power to the controller, and the controller is configured to control opening or closing of the first water outlet and/or the second water outlet.

According to some embodiments of the present disclosure, the control unit further includes a housing, and a water inlet connector, a first water outlet connector and a second water outlet connector connected to the housing. The controller is arranged in the housing. The water inlet connector is communicated with the first water outlet connector and the second water outlet connector respectively. The water inlet connector is connected with a water supply pipe, the first water outlet connector is communicated with the first water outlet for supplying water to the first water outlet. The second water outlet connector is communicated with the second water outlet for supplying water to the second water outlet.

According to some embodiments of the present disclosure, the control unit further includes:
a first pipeline arranged in the housing, and having one end communicated with the water inlet connector, and the other end communicated with the first water outlet connector; and
a second pipeline arranged in the housing, and having one end communicated with the water inlet connector, and the other end communicated with the second water outlet connector.

According to some embodiments of the present disclosure, the control unit further includes a pulse motor assembly located in the housing, the pulse motor assembly is arranged on the second pipeline, and is connected with the controller via signal for providing pulse water to the second water outlet.

According to some embodiments of the present disclosure, the control unit further includes a flow sensor located in the housing, the flow sensor is arranged on the second pipeline and is connected with the controller via signal for monitoring a flow signal in the second pipeline;
the controller is capable of controlling opening or closing of the pulse motor assembly according to the flow signal.

According to some embodiments of the present disclosure, the second water outlet includes a mechanical switch unit for opening or closing a water path of the second water outlet;
the controller controls the pulse motor assembly to be turned off when the mechanical switch unit is in a closing state; and the controller controls the opening of the pulse motor assembly when the mechanical switch unit is in an opening state.

According to some embodiments of the present disclosure, the control unit further includes a second valve located in the housing, the second valve is arranged on the second pipeline, and is connected with the controller via signal for opening or closing the second pipeline;
the second water outlet includes an electric switch unit wirelessly connected with the controller, the controller controls opening or closing of the second valve according to a trigger signal of the electric switch unit.

According to some embodiments of the present disclosure, the control unit further includes a pulse motor assembly located in the housing, the pulse motor assembly is arranged on the second pipeline, and is connected with the controller via signal for supplying pulse water to the second water outlet;
the controller controls opening or closing of the pulse motor assembly according to the trigger signal of the electric switch unit.

According to some embodiments of the present disclosure, the electric switch unit includes a wireless self-generating electric switch.

According to some embodiments of the present disclosure, the control unit further includes a first valve located in the housing, the first valve is arranged on the first pipeline, and is connected with the controller via signal for opening or closing the first pipeline;
the first water outlet includes a water outlet sensor, the water outlet sensor is connected with the controller via signal for acquiring a water outlet signal, and the controller is configured to control opening or closing of the first valve according to the water outlet signal.

According to some embodiments of the present disclosure, the first water outlet includes a thermostatic valve. The thermostatic valve includes a first water inlet opening, a second water inlet opening and a water outlet opening. The first water inlet opening is configured to be connected with a hot water pipe. The second water inlet opening is configured to be connected with a cold water pipe. One end of the water supply pipe is connected with the water outlet opening, and the other end of the water supply pipe is connected with the water inlet connector of the control unit.

According to some embodiments of the present disclosure, the power supply includes a battery, and the battery is electrically connected with the controller.

According to some embodiments of the invention, the battery includes a rechargeable battery.

According to some embodiments of the present disclosure, the first water outlet is a faucet; the second water outlet is a tooth flosser or a toothbrush.

According to some embodiments of the present disclosure, the water outlet device further includes a second connecting pipe having one end connected to the second water outlet, and the other end connected to the control unit; the first water outlet has a pull-out channel, and the second connecting pipe is arranged into the pull-out channel in a pulling-out manner.

According to some embodiments of the present disclosure, the second connecting pipe above the worktable is hidden in the first water outlet and the second water outlet when the second water outlet is connected with the first water outlet.

According to some embodiments of the present disclosure, the first water outlet includes a mounting table and a stopper. The stopper is arranged at one end of the mounting table and protrudes from a table surface of the mounting table, and the stopper and the table surface of the mounting table form a mounting space;

the second water outlet has an abutting surface and an end surface connected to an end of the abutting surface;

when the second water outlet is mounted in the mounting space, the abutting surface abuts against the table surface of the mounting table, and an orthographic projection of the abutting surface on the table surface coincides with the table surface; the end surface abuts against the stopper, and an orthographic projection of the stopper on the end surface coincides with the end surface.

According to some embodiments of the present disclosure, the second water outlet is detachably connected with the first water outlet through a magnetic connection or snap connection.

Any one of the embodiments of the present disclosure has at least the following advantages or beneficial effects:

the first water outlet may be fixedly mounted on the worktable, the second water outlet may be detachably connected to the first water outlet or the worktable, the second water outlet may be held by the operator, and through the combination of the first water outlet and the second water outlet, the diverse use requirements of users may be satisfied. On the one hand, in the water outlet device of the embodiments of the present disclosure, the control unit is designed so that the controller for controlling the opening or closing of the first water outlet and the second water outlet is arranged in the control unit. When the second water outlet is disassembled from the first water outlet or the worktable and used by the user, it can be more convenient for the user to operate the second water outlet since there is no wire for transmitting signals and/or electric energy between the second water outlet and the control unit, and the overall appearance of the water outlet device is more concise. On the other hand, the control unit is mounted on the worktable, and the controller for controlling the opening or closing of the first water outlet and the second water outlet is arranged in the control unit. The controller does not move accordingly when the second water outlet is operated, not only avoiding the controller from being easily damaged when moving back and forth, but also improving safety. It can be seen that, in the water outlet device of the embodiments of the present disclosure, the first water outlet and the second water outlet are combined and controlled separately by the control unit, so that the first water outlet and the second water outlet can realize their respective water outlet functions, realize the effects of easy operation, simple overall appearance and improved safety, avoid the controller from being easily damaged, and achieve the effect of "a whole greater than the sum of the parts".

Figure 1:
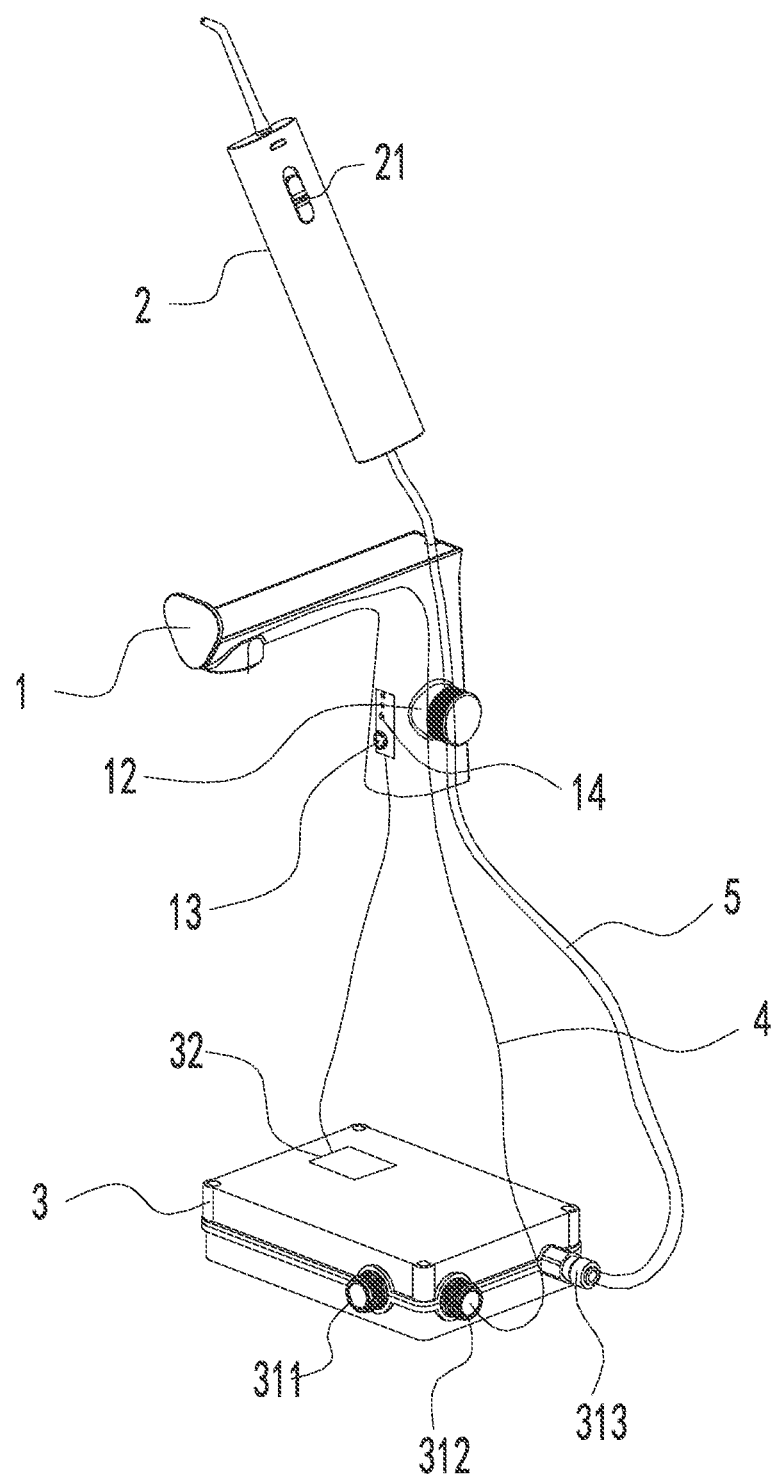
FIG. 1 shows an exploded schematic view of a water outlet device according to an embodiment of the present disclosure.

The reference numbers are listed as follows:
1 First Water Outlet
11 Water Outlet Sensor
12 Thermostatic Valve
121 First Water Inlet Opening
122 Second Water Inlet Opening
123 Water Outlet Opening
13 Pulse Adjustment Button
14 Shift Position Indicator
15 Pull-out channel
16 Mounting Table
161 Table Surface
17 Stopper
18 Mounting Space
2 Second Water Outlet
21 Mechanical Switch Unit
22 Electric Switch Unit
23 Abutting Surface
24 End Surface
3 Control Unit
31 Housing
311 Water Inlet Connector
312 First Water Outlet Connector
313 Second Water Outlet Connector
32 Controller
33 Power Supply
34 First Pipeline
35 Second Pipeline
36 Pulse Motor Assembly 361 Upper Cover
362 Lower cover
363 Motor
364 Shift Position
365 Connecting Rod
366 Piston
367 Cavity
368 Duckbill Valve
369 Anti-reverse Sheet
37 Flow Sensor
38 Second Valve
39 First Valve
391 Pressure Reducing Valve
4 First Connecting Pipe
5 Second Connecting Pipe
6 Water Supply Pipe

DETAILED DESCRIPTION

Example embodiments will now be described more fully with reference to the accompanying drawings. However, example embodiments may be embodied in many forms and should not be construed as being limited to the embodiments set forth herein; rather, these embodiments are provided so that the present disclosure will be thorough and complete, and will fully convey the concept of example embodiments to those skilled in the art. The same reference numbers in the drawings denote the same or similar structures, and thus their detailed descriptions will be omitted.

Figure 2:
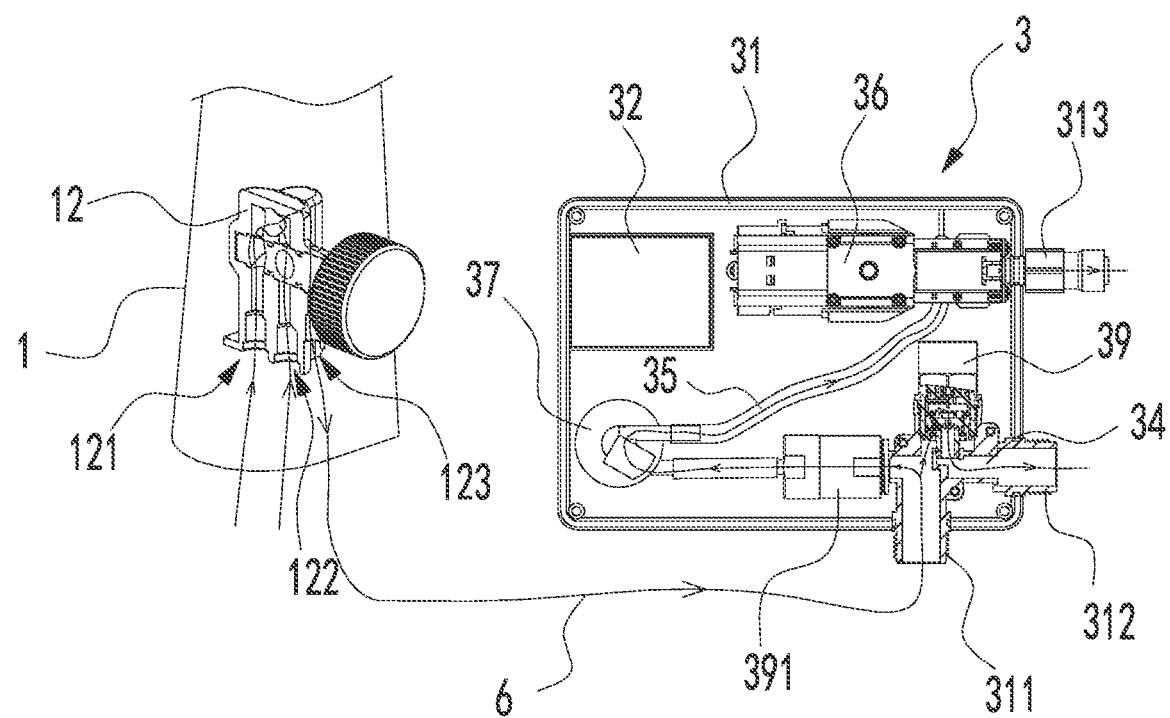
FIG. 2 shows a sectional schematic view of a first water outlet and a control unit of the water outlet device according to the embodiment of the present disclosure, wherein a water inlet connector, a first water outlet connector and a first valve of the controller are shown.

As shown in FIGS. 1 and 2, FIG. 1 shows an exploded view of a water outlet device according to an embodiment of the present disclosure, and FIG. 2 shows a schematic view of a first water outlet 1 and a control unit 3 of the water outlet device according to the embodiment of the present disclosure, wherein a water inlet connector 311, a first water outlet connector 312 and a first valve 39 of the control unit 3 are shown in sectional views. The water outlet device of the embodiment of the present disclosure includes a first water outlet 1, a second water outlet 2 and a control unit 3. The first water outlet 1 is configured to be fixedly mounted on a worktable (not shown). The second water outlet 2 is detachably connected to the first water outlet 1 or the worktable for an operator to hold. The control unit 3 is configured to be mounted on the worktable, and includes a housing 31, a controller 32 and a power supply 33. The power supply 33 is electrically connected with the controller 32, and the controller 32 is arranged in the housing 31 to control opening or closing of the first water outlet 1 and/or the second water outlet 2.

It can be understood that the terms "include" and "have" and any variations thereof in the embodiments of the present disclosure are intended to cover non-exclusive inclusion. For example, a process, method, system, product or device including a series of steps or units is not limited to the listed steps or units, but optionally also includes unlisted steps or units, or optionally further includes other steps or components inherent in those processes, methods, products, or devices.

In this embodiment, the first water outlet 1 may be fixedly mounted on the worktable, the second water outlet 2 is detachably connected to the first water outlet 1 or the worktable, and the second water outlet 2 may be held by the operator. The combination of the first water outlet 1 and the second water outlet 2 can satisfy the diverse use requirements of users. On the one hand, in the water outlet device of the embodiment of the present disclosure, the control unit 3 is designed so that the controller 32 for controlling the opening or closing of the first water outlet 1 and the second water outlet 2 is arranged in the control unit 3. When the second water outlet 2 is disassembled from the first water outlet 1 or the worktable and used by the user, it can be more convenient for the user to operate the second water outlet 2 since there is no wire for transmitting signals and/or electric energy between the second water outlet 2 and the control unit 3, and the overall appearance of the water outlet device is more concise. On the other hand, a control module of the existing tooth flosser is integrated on a handle of the tooth flosser and moves back and forth when in use, while the control unit 3 of the embodiment of the present disclosure is mounted on the worktable, and the controller 32 for controlling the opening or closing of the first water outlet 1 and the second water outlet 2 is arranged in the control unit 3. The controller 32 does not move accordingly when the second water outlet 2 is operated, not only avoiding the controller 32 from being easily damaged when moving back and forth, but also improving safety. It can be seen that, in the water outlet device of the embodiments of the present disclosure, the first water outlet 1 and the second water outlet 2 are combined and controlled separately by the control unit 3, so that the first water outlet 1 and the second water outlet 2 can realize their respective water outlet functions, realize the effects of easy operation, simple overall appearance and improved safety, avoid the controller from being easily damaged, and achieve the effect of "a whole greater than the sum of the parts".

It can be understood that the first water outlet 1 may be a faucet, and the second water outlet 2 may be a tooth flosser or a toothbrush. Specifically, when the first water outlet 1 is a faucet and the second water outlet 2 is a tooth flosser, the water outlet device of the embodiment of the present disclosure can satisfy the use requirements of both the faucet and the tooth flosser. There are many ways to switch between the tooth flosser and the toothbrush. For example, a handle of the second water outlet 2 remains unchanged, and only by replacing a tooth washing nozzle and a toothbrush head, the tooth washing nozzle and the toothbrush head may be connected with the handle of the second water outlet 2 in a clamping manner. Of course, it is also possible to switch between different usage requirements by replacing the flosser and toothbrush as a whole.

Further referring to FIGS. 1 and 2, the control unit 3 further includes a water inlet connector 311, a first water outlet connector 312 and a second water outlet connector 313 connected to the housing 31. The water inlet connector 311 is connected with the first water outlet connector 312 and the second water outlet connector 313, respectively. The water inlet connector 311 is connected with a water supply pipe 6. The first water outlet connector 312 is communicated with the first water outlet 1 for supplying water to the first water outlet 1. The second water outlet connector 313 is communicated with the second water outlet 2 for supplying water to the second water outlet 2.

The control unit 3 further includes a first pipeline 34 and a second pipeline 35. The first pipeline 34 is arranged in the housing 31. One end of the first pipeline 34 is communicated with the water inlet connector 311, and the other end is communicated with the first water outlet connector 312. The second pipeline 35 is arranged in the housing 31. One end of the second pipeline 35 is communicated with the water inlet connector 311, and the other end is communicated with the second water outlet connector 313.

In this embodiment, a water path in the control unit 3 is divided into two paths, that is, the first pipeline 34 and the second pipeline 35. The water supply pipe 6 is connected with the water inlet connector 311, and the water supplied by the water supply pipe 6 enters the control unit 3 through the water inlet connector 311, and is then divided into two paths, flowing along the first pipeline 34 and the second pipeline 35 respectively. The water flowing along the first pipeline 34 flows into the first water outlet 1 through the first water outlet connector 312, and the water flowing along the second pipeline 35 flows into the second water outlet 2 through the second water outlet connector 313.

That is, the control unit 3 of the water outlet device of the embodiment of the present disclosure also plays the role of diversion, the water supplied from the outside is divided through the first pipeline 34 and the second pipeline 35 in the control unit 3, and flows into the first water outlet 1 and the second water outlet 2 respectively. Compared with the separate water paths of the first water outlet 1 and the second water outlet 2 in the related art, with the diversion function of the control unit 3 in the embodiment of the present disclosure, the temperature of water flowing out of the first water outlet 1 and the second water outlet 2 is kept consistent, thereby avoiding water temperature difference between two water outlets, which reduces user experience.

It can be understood that the diversion structure in the control unit 3 is not limited to using the first pipeline 34 and the second pipeline 35, for example, the housing 31 of the control unit 3 may be separated into a plurality of compartments, wherein one of the compartments is communicated with the water inlet connector 311 and the first water outlet connector 312, another one of the compartments is communicated with the water inlet connector 311 and the second water outlet connector 313, and the rest of the compartments may be configured to accommodate electronic control elements such as the controller 32.

The first water outlet 1 includes a thermostatic valve 12. The thermostatic valve 12 includes a first water inlet opening 121, a second water inlet opening 122 and a water outlet opening 123. The first water inlet opening 121 is configured to connect with a hot water pipe. The second water inlet opening 122 is configured to connect with a cold water pipe. One end of the water supply pipe 6 is connected with the water outlet opening 123, and the other end is connected with the water inlet connector 311. The hot water pipe may supply hot water, and the cold water pipe may supply cold water. The hot water enters the thermostatic valve 12 through the first water inlet opening 121, and cold water enters the thermostatic valve 12 through the second water inlet opening 122. The hot water and the cold water may be mixed in the thermostatic valve 12 to form warm water, and the warm water flows out of the water outlet opening 123 into the water supply pipe 6.

The opening degrees of the first water inlet opening 121 and the second water inlet opening 122 may be adjusted by operating a valve rod of the thermostatic valve 12, thereby changing the temperature of the warm water. For example, when the opening degree of the first water inlet opening 121 is large and the opening degree of the second water inlet opening 122 is small, the temperature of the warm water flowing out of the water outlet opening 123 is relatively high. When the opening degree of the first water inlet opening 121 is small and the opening degree of the second water inlet opening 122 is large, the temperature of the warm water flowing out of the water outlet opening 123 is relatively low.

In this embodiment, a water source of the second water outlet 2 is controlled by the thermostatic valve 12, and passes through the water inlet connector 311, the second pipeline 35 and the second water outlet connector 313 sequentially, thereby realizing automatic water supply, and a water storage tank needs not to be provided for the second water outlet 2, avoiding cumbersome water adding actions. In addition, the water temperature may be adjusted through the thermostatic valve 12 by the user according to his own situation.

The water outlet device further includes a first connecting pipe 4 and a second connecting pipe 5. One end of the first connecting pipe 4 is connected with the first water outlet connector 312, and the other end is connected with the first water outlet 1. One end of the second connecting pipe 5 is connected with the second water outlet connector 313, and the other end is connected with the second water outlet 2.

The second connecting pipe 5 may be a pull-out hose, which is not limited thereto. When the second water outlet 2 is detachably connected with the first water outlet 1, the second connecting pipe 5 is movably arranged into the first water outlet 1.

Figure 3:
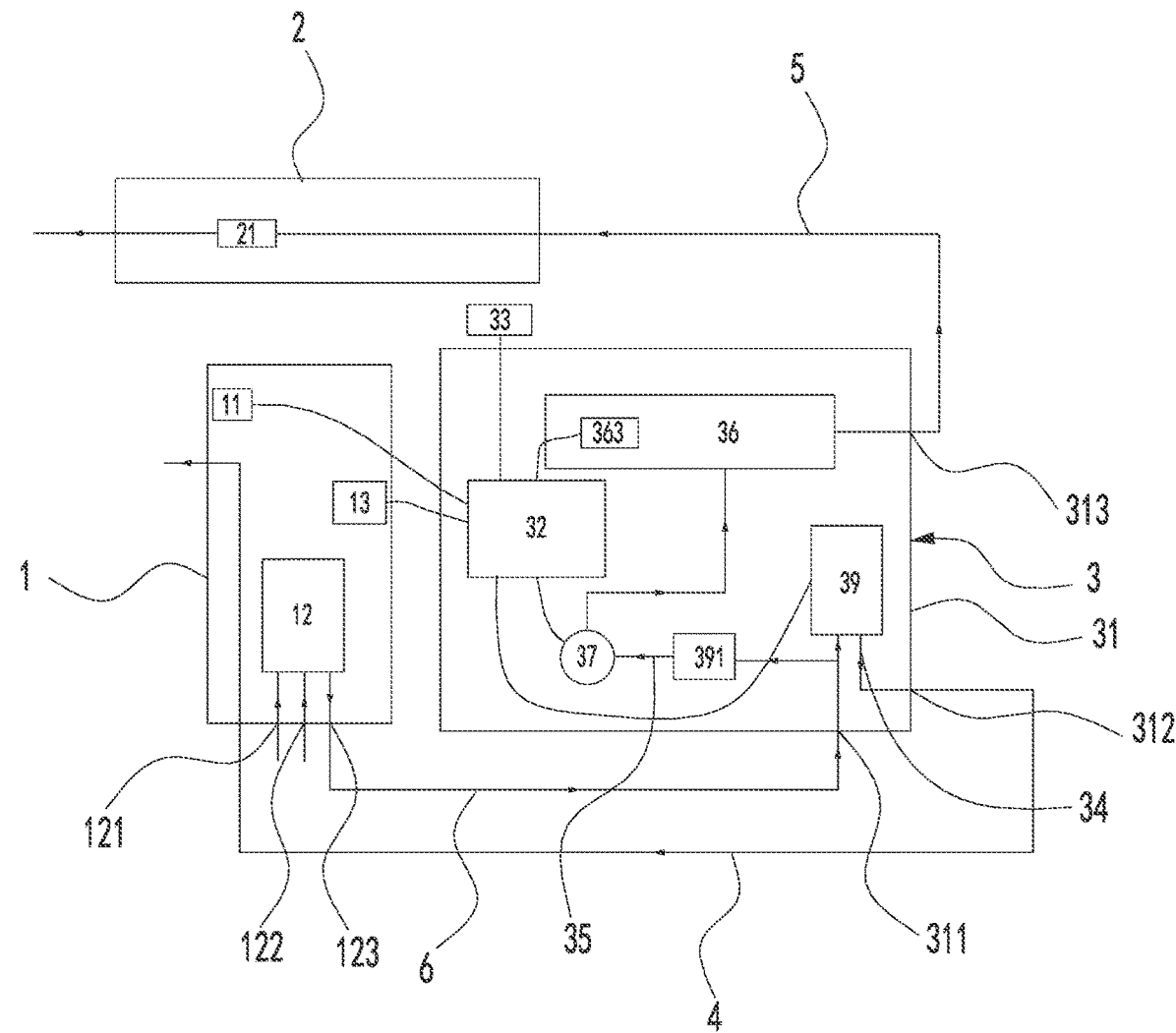
FIG. 3 shows a schematic view of a water path and electric control of the water outlet device according to a first embodiment of the present disclosure.

As shown in FIG. 3, FIG. 3 shows a schematic view of a water path and electric control of the water outlet device according to a first embodiment of the present disclosure. The control unit 3 includes a housing 31, a controller 32, a pulse motor assembly 36, a flow sensor 37 and a power supply 33. Each of the controller 32, the pulse motor assembly 36 and the flow sensor 37 is located in the housing 31. The controller 32 is connected with the pulse motor assembly 36 via signal, and the controller 32 is connected with the flow sensor 37 via signal.

It can be understood that the controller 32 and the pulse motor assembly 36 may be in a wired or wireless connection, such as wifi, bluetooth and the like. The controller 32 and the flow sensor 37 may be in a wired or wireless connection.

The pulse motor assembly 36 is arranged on the second pipeline 35 for supplying pulse water to the second water outlet 2. The controller 32 may control opening or closing of a motor 363 of the pulse motor assembly 36. The flow sensor 37 is arranged on the second pipeline 35 for monitoring a flow signal in the second pipeline 35. The controller 32 may control the pulse motor assembly 36 according to the flow signal.

The second water outlet 2 includes a mechanical switch unit 21 for opening or closing the water path of the second water outlet 2. When the mechanical switch unit 21 is in a closing state, the controller 32 controls the pulse motor assembly 36 to be turned off; and when the mechanical switch unit 21 is in an opening state, the controller 32 controls the opening of the pulse motor assembly 36.

In this embodiment, the mechanical switch unit 21 may be a water stop valve. When the water stop valve is in a closed state, the water stop valve blocks the water path of the second water outlet 2, the flow sensor 37 gives a stop-flowing flow signal, and the controller 32 controls the pulse motor assembly 36 to be turned off. As the pulse motor assembly 36 is turned off, pulse water will not be provided to the second water outlet 2. When the water stop valve is in an open state, the water path of the second water outlet 2 is opened, the flow sensor 37 gives a flowing flow signal, the controller 32 controls the opening of the pulse motor assembly 36, and finally forms pulse water for users to use. When the water stop valve is closed again, as the water flow in the second pipeline 35 stops, the flow sensor 37 gives a stop-flowing flow signal again, and the controller 32 controls the pulse motor assembly 36 to be turned off.

The control unit 3 further includes a pressure reducing valve 391, and the pressure reducing valve 391 is arranged on the second pipeline 35. With the arrangement of the pressure reducing valve 391, the water pressure in the second pipeline 35 may be maintained below 0.8 bar, so as to form better pulse water.

The control unit 3 further includes a first valve 39 located in the housing 31, the first valve 39 is arranged on the first pipeline 34 and is connected with the controller 32 via signal for opening or closing the first pipeline 34. The first valve 39 and the controller 32 may be in a wired or wireless connection.

In one embodiment, the first valve 39 may be a solenoid valve.

Figure 5:
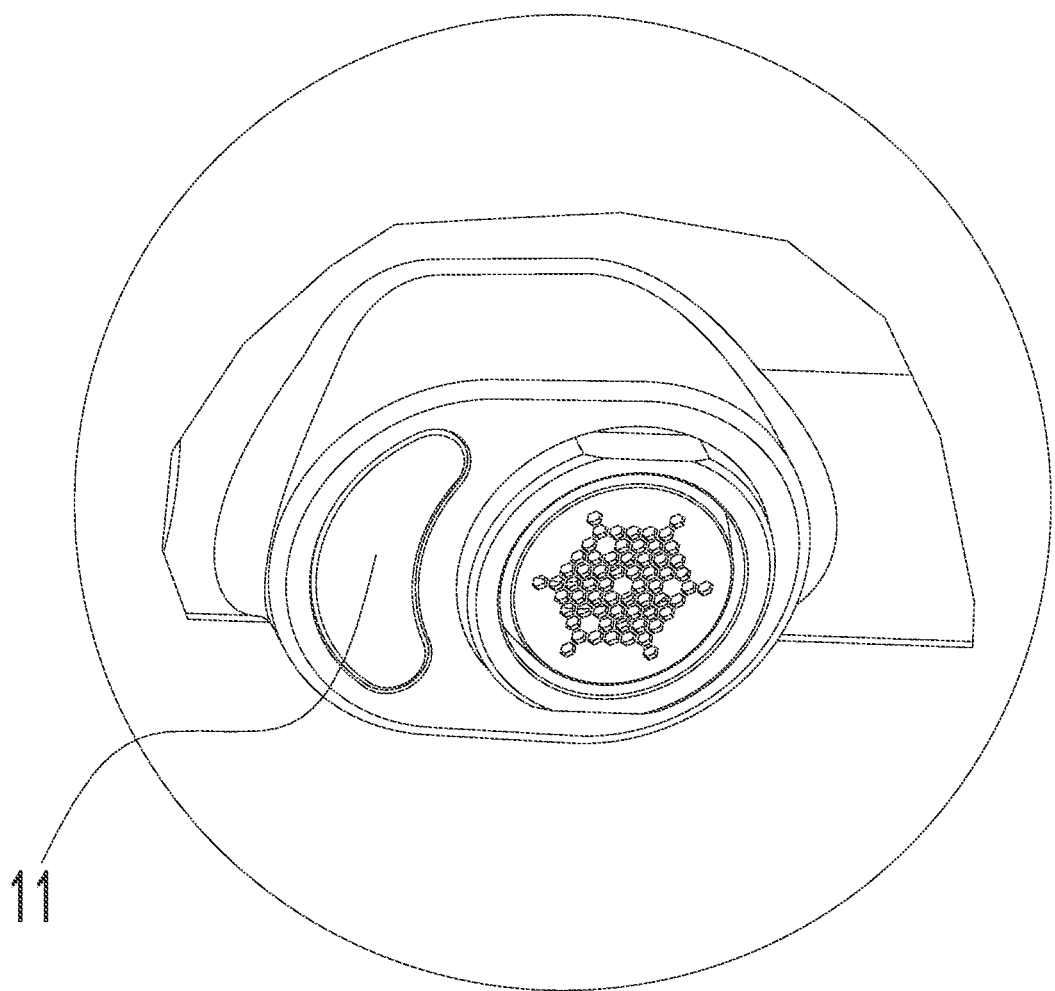
FIG. 5 shows a schematic view of a water outlet sensor of the first water outlet according to the present disclosure.

As shown in FIG. 5, FIG. 5 shows a schematic view of a water outlet sensor 11 of the first water outlet 1 according to the present disclosure. The first water outlet device 1 includes a water outlet sensor 11. The water outlet sensor 11 is connected with the controller 32 for acquiring a water outlet signal. The controller 32 may control the opening or closing of the first valve 39 according to the water outlet signal.

The water outlet sensor 11 may be an infrared sensor, which is not limited thereto. When the water outlet sensor 11 finds a hand gesture signal of the user, the controller 32 controls the first valve 39 to be opened, thereby allowing the first water outlet 1 to output water.

It can be understood that, the water outlet sensor 11 and the controller 32 may be in a wired or wireless connection. When the wired connection is used, the first water outlet 1 may be fixedly mounted on a table surface of the worktable, the control unit 3 may be mounted under the table surface of the worktable, and a wire connecting the water outlet sensor 11 and the controller 32 may be hidden in the first water outlet 1, one end of the wire is connected with the water outlet sensor 11, and the other end extends through the worktable into the control unit 3 to be connected with the controller 32.

As shown in FIG. 1, the water outlet device further includes a pulse adjustment button 13 and a shift position indicator 14. The pulse adjustment button 13 is connected with the controller 32 via signal for adjusting a pulse frequency of the pulse water. Specifically, when the pulse adjustment button 13 is operated by the user to generate an adjustment signal, the controller 32 controls a rotation speed of the motor 363 of the pulse motor assembly 36 according to the adjustment signal, thereby adjusting the pulse frequency of the pulse water. By adjusting the pulse frequency, the pulse water of the second water outlet 2 may be adapted to different requirements of different users.

It can be understood that the pulse adjustment button 13 and the controller 32 may be in a wired or wirelessly connection. When the pulse adjustment button 13 is connected with the controller 32 through the wireless connection, the pulse adjustment button 13 may be arranged on the first water outlet 1 or the second water outlet 2. When the pulse adjustment button 13 is connected to the controller 32 through the wired connection, the pulse adjustment button 13 is arranged on the first water outlet 1. A wire between the pulse adjustment button 13 and the controller 32 may be hidden in the first water outlet 1, and one end of the wire is connected to the pulse adjustment button 13, and the other end extends through the worktable into the control unit 3 to be connected with the controller 32.

The shift position indicator 14 is configured to display a pulse shift position. For example, the shift position indicator 14 may display three shift positions which are respectively low shift position, medium shift position and high shift position. The "low shift position" means that the current pulse water is in a low-frequency pulse, the "medium shift position" means that the current pulse water is in a medium-frequency pulse, and the "high shift position" means that the current pulse water is in a high-frequency pulse.

The shift position indicator 14 may be arranged on the first water outlet 1, and connected with the controller 32 through a wired or wireless connection.

Figure 6:
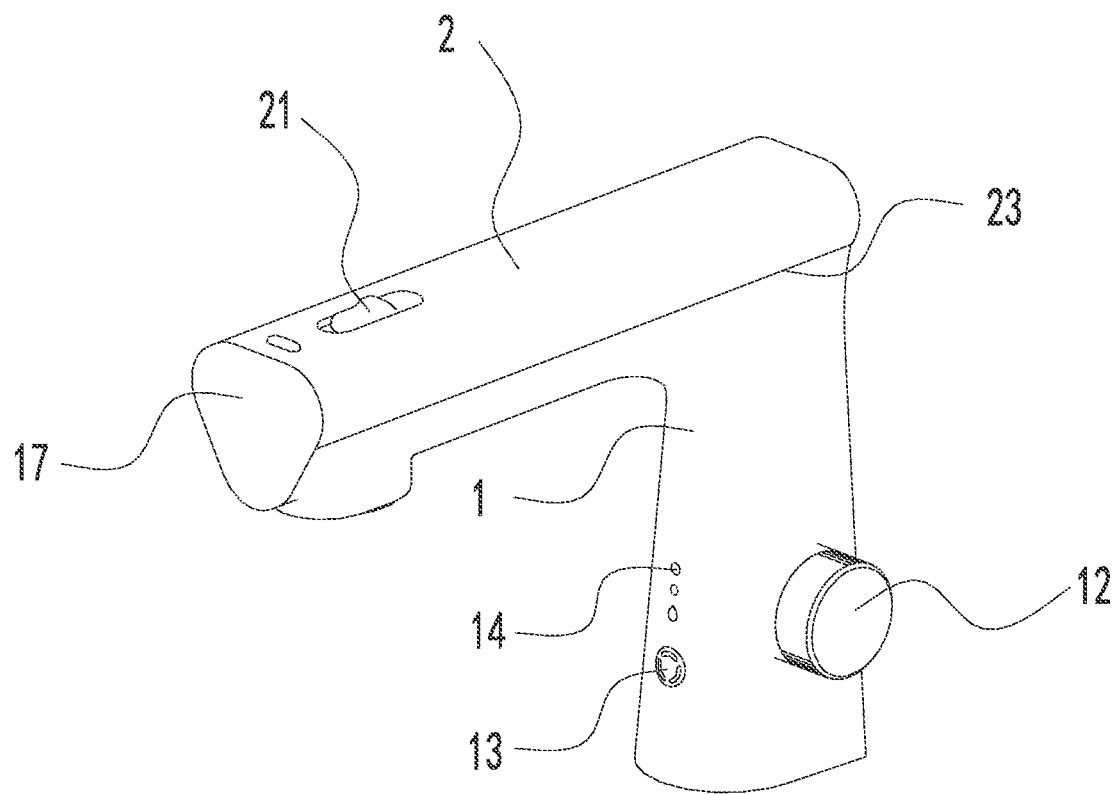
FIG. 6 shows a schematic view of the first water outlet and the second water outlet after they are assembled according to an embodiment of the present disclosure.
Figure 7:
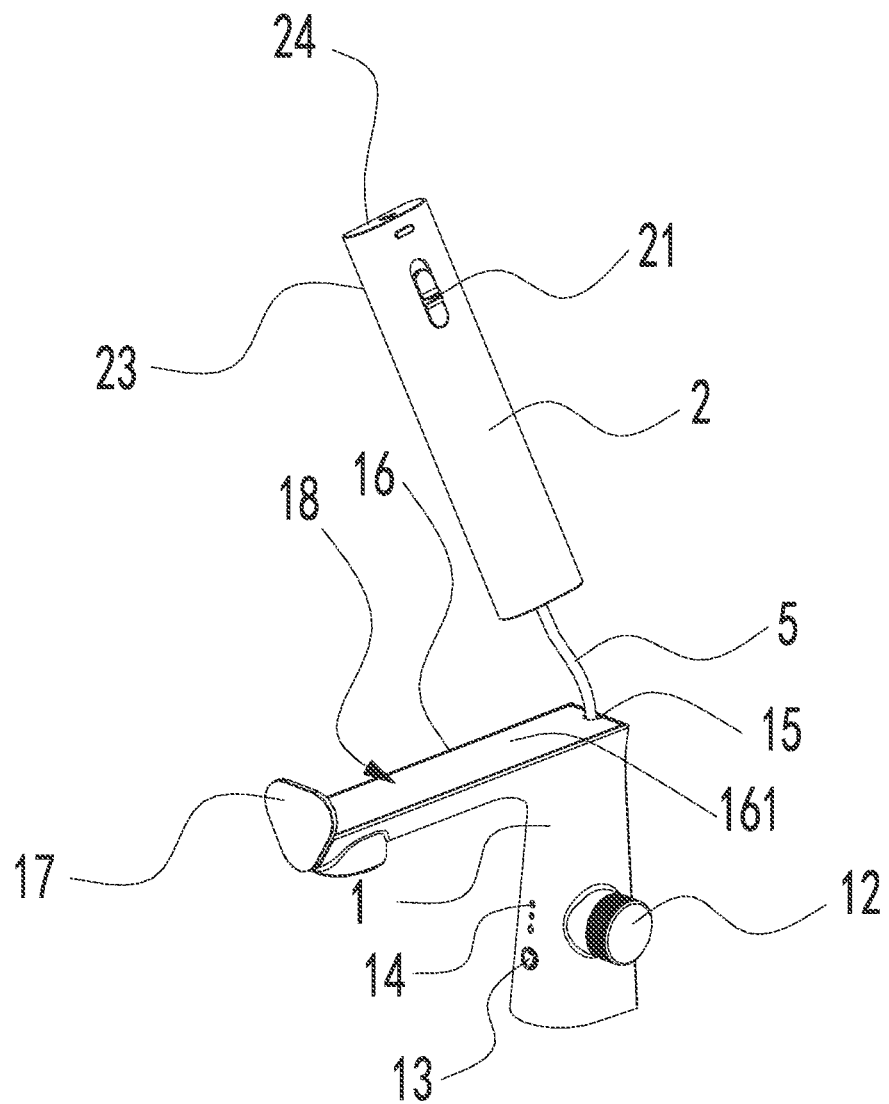
FIG. 7 shows a schematic view of the first water outlet and the second water outlet after they are disassembled according to the embodiment of the present disclosure.

As shown in FIGS. 6 and 7, FIG. 6 shows a schematic view of the first water outlet 1 and the second water outlet 2 after they are assembled according to an embodiment of the present disclosure. FIG. 7 shows a schematic view of the first water outlet 1 and the second water outlet 2 after they are disassembled according to the embodiment of the present disclosure. In this embodiment, the second water outlet 2 is detachably connected to the first water outlet 1. The second water outlet 2 is connected with the second water outlet connector 313 of the control unit 3 through the pull-out hose. The first water outlet 1 has a pull-out channel 15, and the second connecting pipe 5 is arranged into the pull-out channel 15 in a pulling-out manner.

When the second water outlet 2 is connected with the first water outlet 1, the second connecting pipe 5 located above the worktable is hidden in the second water outlet 2 and the first water outlet 1. Specifically, the second connecting pipe 5 is divided into two parts, that is, one part is located above the worktable, and the other part is located below the worktable. The second connecting pipe 5 located above the worktable may extend through the pull-out channel 15 and be connected with the second water outlet 2. The second connecting pipe 5 located under the worktable is connected with the second water outlet connector 313 of the control unit 3. The second connecting pipe 5 located above the worktable is further divided into two small parts, one of which is hidden in the first water outlet 1, and the other small part of which is hidden in the second water outlet 2.

When the second water outlet 2 is not used by the user, the second water outlet 2 is connected with the first water outlet 1, and the second connecting pipe 5 above the worktable is hidden in the second water outlet 2 and the first water outlet 1 and not exposed, so that the overall appearance of the first water outlet 1 and the second water outlet 2 is more concise.

Further referring to FIGS. 6 and 7, the first water outlet 1 includes a mounting table 16 and a stopper 17. The stopper 17 is arranged at one end of the mounting table 16, and protrudes from the table surface 161 of the mounting table 16, the stopper 17 and the table surface 161 of the mounting table 16 form a mounting space 18 for accommodating the second water outlet 2.

The stopper 17 may be in the form of a sheet, which is not limited thereto. The table surface 161 of the mounting table 16 may be a plane, which is not limited thereto. A shape of the table surface 161 of the mounting table 16 may be adaptively adjusted according to a shape of an outer contour of the second water outlet 2.

The second water outlet 2 has an abutting surface 23 and an end surface 24, and the end surface 24 is connected to one end of the abutting surface 23.

When the second water outlet 2 is mounted in the mounting space 18, the abutting surface 23 abuts against the table surface 161 of the mounting table 16, and an orthographic projection of the abutting surface 161 on the table surface 161 of the mounting table 16 coincides with the table surface 161. The end surface 24 of the second water outlet 2 abuts against the stopper 17, and an orthographic projection of the stopper 17 on the end surface 24 coincides with the end surface 24.

That is, when the second water outlet 2 is not used by the user, the second water outlet 2 is accommodated in the mounting space 18 of the first water outlet 1. Moreover, the outer contour of the second water outlet 2 is basically aligned with an outer contour of the mounting table 16 and the stopper 17 of the first water outlet 1, and there is basically no clearance between the first water outlet 1 and the second water outlet 2, so that their basically form an integral component in appearance, further improving the aesthetics of the water outlet device of the embodiment of the present disclosure.

In one embodiment, the second water outlet 2 may be detachably connected with the first water outlet 1 through a magnetic connection or snap connection. When it is connected through the magnetic connection, two components that may be magnetically attracted to each other may be respectively arranged on the first water outlet 1 and the second water outlet 2. For example, one of the magnetic components is arranged on the table surface 161 of the first water outlet 1, and the other magnetic component is arranged on the abutting surface 23 of the second water outlet 2. When it is connected through the snap connection, a clamping hook and a clamping buckle may be respectively arranged on the first water outlet 1 and the second water outlet 2.

Of course, in other embodiments, the second water outlet 2 may also be detachably connected with the worktable.

Figure 8:
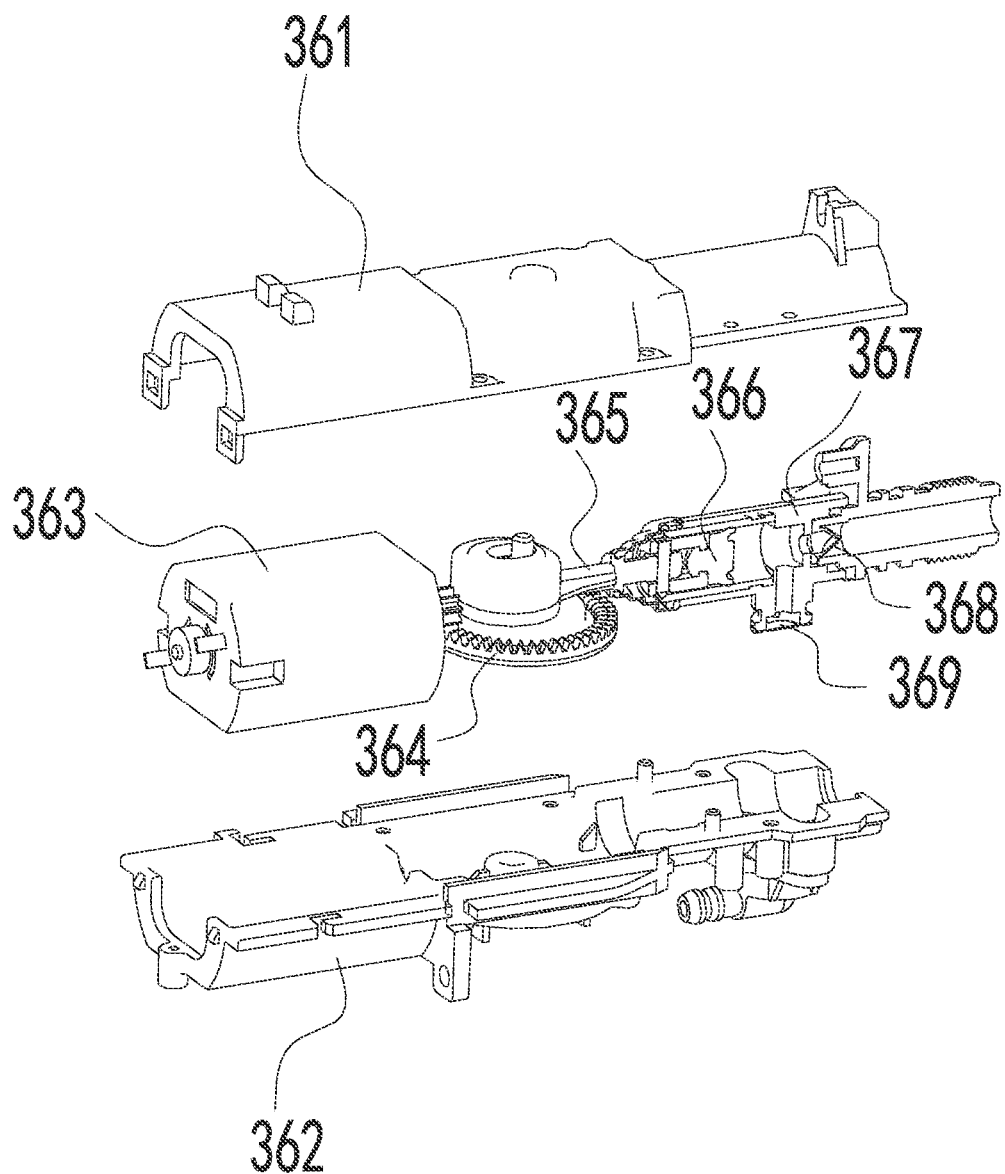
FIG. 8 shows an exploded schematic view of a pulse motor assembly according to the embodiment of the present disclosure.
Figure 9:
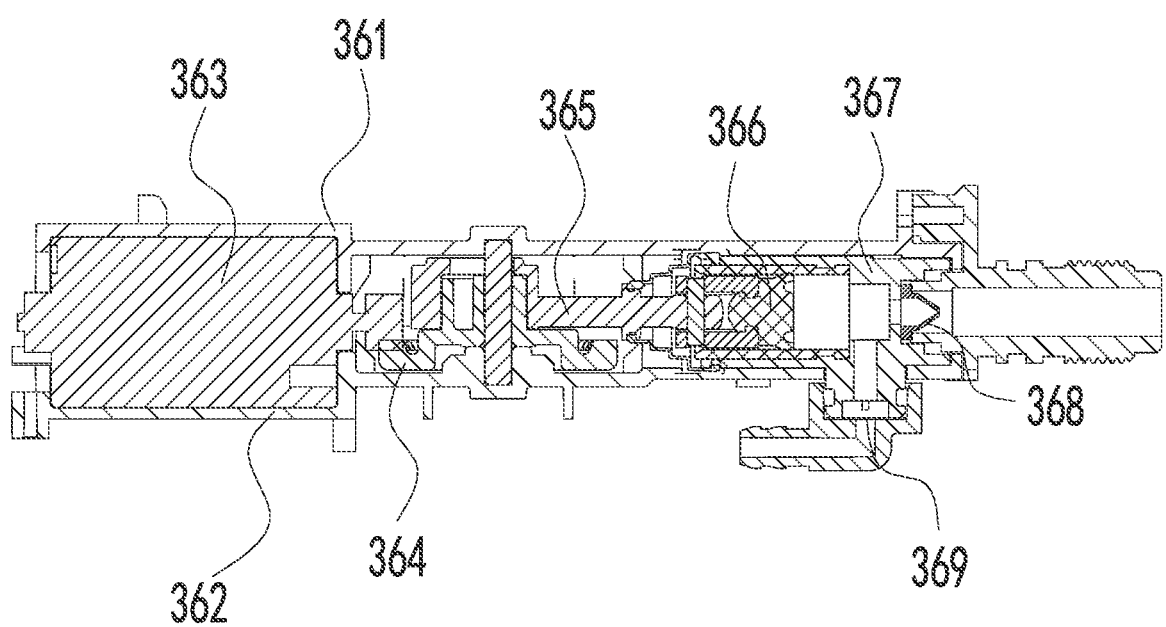
FIG. 9 shows a sectional view of the pulse motor assembly according to the embodiment of the present disclosure.

As shown in FIGS. 8 and 9, FIG. 8 shows an exploded schematic view of the pulse motor assembly 36 according to the embodiment of the present disclosure. FIG. 9 shows a sectional view of the pulse motor assembly 36 according to an embodiment of the present disclosure. The pulse motor assembly 36 of the embodiment of the present disclosure includes an upper cover 361, a lower cover 362, a motor 363, a shift position 364, a connecting rod 365, a piston 366 and a cavity 367. The upper cover 361 and the lower cover 362 are clamped for example by bolts to form a chamber, and the chamber is configured to accommodate the motor 363, the shift position 364, the connecting rod 365, the piston 366 and a portion of the cavity 367.

An output shift position of the motor 363 is engaged with the shift position 364, and the shift position 364 may act as a reduction shift position to reduce the rotation speed of the motor 363 with a certain transmission ratio. The connecting rod 365 is respectively connected to the shift position 364 and the piston 366, and the connecting rod 365 may convert a rotational motion of the shift position 364 into an axial reciprocating motion of the piston 366. For example, the connecting rod 365 may be a slider crank mechanism.

The piston 366 is movably arranged in the cavity 367, and the pressure in the cavity 367 is changed through the axial reciprocating movement, thereby realizing water suction and pumping.

The pulse motor assembly 36 of the embodiment of the present disclosure further includes a duckbill valve 368 and an anti-reverse sheet 369. The duckbill valve 368 is arranged in the cavity 367 for guiding the water from an inlet end of the cavity 367 to an outlet end. The anti-reverse sheet 369 is arranged at the inlet end of the cavity 367 for preventing the water in the cavity 367 from flowing back. Under the common action of the duckbill valve 368 and the anti-reverse sheet 369, the water can be ensured to flow from the inlet end to the outlet end of the cavity 367.

In the technical solution of the present disclosure, the power supply 33 includes a battery, and the battery is arranged in the housing 31 and is electrically connected with the controller 32. The battery may supply power to the controller 32. The connection between the battery and the controller 32 may be a wired or wireless connection.

In this embodiment, the battery and the controller 32 are arranged in the housing 31, so that the control unit 3 has no external wire. In this way, when in use, safety problems caused by electric shock can be avoided, and the integration degree of the control unit 3 may be further improved, enabling the overall appearance more concise.

It can be understood that the battery includes a rechargeable battery, which may be charged in a wired or wireless manner.

Of course, in other embodiments, the power supply 33 may also use a manner of inserting an external plug into a socket.

Figure 4:
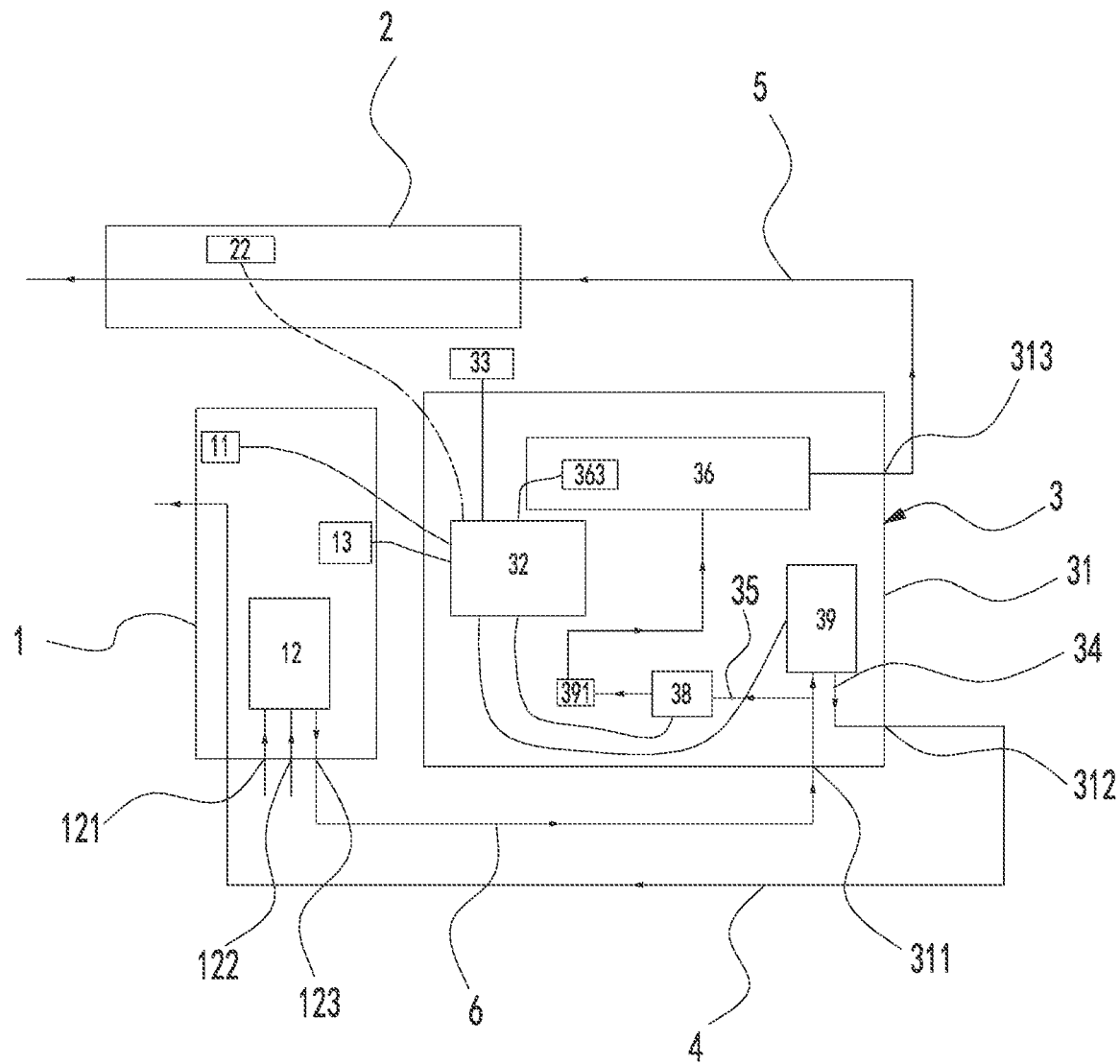
FIG. 4 shows a schematic view of a water path and electric control of the water outlet device according to a second embodiment of the present disclosure.

As shown in FIG. 4, FIG. 4 shows a schematic view of the water path and electric control of the water outlet device according to a second embodiment of the present disclosure. The similarities between the second embodiment and the first embodiment will not be repeated, however, the difference therebetween is as follows.

The control unit 3 further includes a second valve 38 located in the housing 31, the second valve 38 is arranged on the second pipeline 35 and connected with the controller 32 via signal for opening or closing the second pipeline 35. The second water outlet 2 includes an electric switch unit 22, and the electric switch unit 22 is wirelessly connected with the controller 32. The controller 32 controls the opening or closing of the second valve 38 according to a trigger signal of the electric switch unit 22.

In this embodiment, the user presses the electric switch unit 22, and the controller 32 controls the opening of the second valve 38 after an opening trigger signal of the electric switch unit 22 is obtained, so that the water path of the second water outlet 2 is conducted, and finally water can flow out of the second water outlet 2. When the user operates the electric switch unit 22 again, the controller 32 controls the second valve 38 to be closed after a closing trigger signal of the electric switch unit 22 is obtained, so that the water path of the second water outlet 2 is closed, and the water is stopped from flowing out of the second water outlet 2.

In one embodiment, the second valve 38 may be a solenoid valve. The second valve 38 and the controller 32 may be in a wired or wireless connection.

The control unit 3 further includes a pulse motor assembly 36 located in the housing 31, the pulse motor assembly 36 is arranged on the second pipeline 35 and is connected with the controller 32 via signal for supplying pulse water to the second water outlet 2. The controller 32 controls the opening or closing of the pulse motor assembly 36 according to a trigger signal of the electric switch unit 22. According to the trigger signal of the electric switch unit 22, the second valve 38 and the pulse motor assembly 36 may be opened or closed synchronously. Specifically, the user presses the electric switch unit 22, and the controller 32 controls the opening of the second valve 38 and the pulse motor assembly 36 simultaneously, so that the water path of the second water outlet 2 is conducted, and finally pulse water can be flowed out of the second water outlet 2. After the user presses the electric switch unit 22 again, the controller 32 controls the second valve 38 to be closed and the pulse motor assembly 36 to be turned off simultaneously, and the water can be stopped from flowing out of the second water outlet 2.

In one embodiment, the electrical switch unit 22 includes a wireless self-generating switch.

It can be understood that the various embodiments/implementations provided by the present disclosure can be combined with each other if no contradiction arises, and will not be described herein one by one.

In the embodiments of the present disclosure, the terms "first", "second" and "third" are only intended to describe objectives of the present disclosure, and cannot be understood as indicating or implying relative importance. The expression "a plurality" refers to two or more, unless otherwise explicitly defined. The terms "install", "inter-connect", "connect" and "fixed" or the like should be understood broadly. For example, "connect" may mean a fixed connection, a detachable connection, or an integral connection. The term "inter-connect" may mean a directly connection or indirectly connection through an intermediate element. For the skilled person in the art, the specific meanings of the above terms in the embodiments of the present disclosure can be understood according to specific situations.

According to the description of the embodiments of the present disclosure, it should be understood that the directions or positional relationships indicated by the terms "up", "down", "left", "right", "front", "back" and the like are based on the directions or positional relationships shown in the drawings, only for the convenience of describing and simplifying the embodiments of the present disclosure, instead of indicating or implying that the referred devices or units must have a specific direction, be constructed and operated in a specific direction. Therefore, it cannot be understood as limitation to the present disclosure.

According to the description of this specification, the terms "an embodiment", "some embodiments" and "specific embodiments" means that the specific features, structures, materials or characteristics described in connection with this embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner.

The above are only preferred embodiments of the embodiments of the present disclosure, and are not intended to limit the embodiments. For the skilled person in the art, the embodiments may have various modifications and changes, and any modifications, equivalent substitutions, improvements, etc. made within spirit and principle of the embodiment of the present disclosure shall be included in the protection scope of the embodiments of the present disclosure.

What is claimed is:

1. A water outlet device, comprising:
   a first water outlet configured to fixedly mounted on a worktable;
   a second water outlet detachably connected to the first water outlet or the worktable for an operator to hold; and
   a control unit configured to be mounted on the worktable, and comprising a controller and a power supply, wherein the power supply is electrically connected to the controller for supplying power to the controller, and the controller is configured to control opening or closing of the first water outlet and/or the second water outlet,
   wherein the first water outlet comprises a mounting table and a stopper, the stopper is arranged at an end of the mounting table and protrudes from a table surface of the mounting table, the stopper and the table surface of the mounting table form a mounting space;
   the second water outlet has an abutting surface and an end surface connected to an end of the abutting surface; when the second water outlet is mounted in the mounting space, the abutting surface abuts against the table surface of the mounting table, and an orthographic projection of the abutting surface on the table surface coincides with the table surface; the end surface abuts against the stopper, and an orthographic projection of the stopper on the end surface coincides with the end surface.

2. The water outlet device according to claim 1, wherein the control unit further comprises a housing, and a water inlet connector, a first water outlet connector and a second water outlet connector connected to the housing, and the controller is arranged in the housing, the water inlet connector is communicated with the first water outlet connector and the second water outlet connector, respectively; the water inlet connector is connected with a water supply pipe, the first water outlet connector is communicated with the first water outlet, for supplying water to the first water outlet; and the second water outlet connector is communicated with the second water outlet, for supplying water to the second water outlet.

3. The water outlet device according to claim 2, wherein the control unit further comprises:
   a first pipeline arranged in the housing, and having one end communicated with the water inlet connector, and the other end communicated with the first water outlet connector; and
   a second pipeline arranged in the housing, and having one end communicated with the water inlet connector, and the other end communicated with the second water outlet connector.

4. The water outlet device according to claim 3, wherein the control unit further comprises a pulse motor assembly in the housing, the pulse motor assembly is arranged to the second pipeline, and is connected with the controller via signal for providing pulse water to the second water outlet.

5. The water outlet device according to claim 4, wherein the control unit further comprises a flow sensor in the housing, the flow sensor is arranged to the second pipeline and is connected with the controller via signal for monitoring a flow signal in the second pipeline;
   the controller is configured to control opening or closing of the pulse motor assembly according to the flow signal.

6. The water outlet device according to claim 5, wherein the second water outlet comprises a mechanical switch unit for opening or closing a water path of the second water outlet;
   the controller controls the closing of the pulse motor assembly when the mechanical switch unit is in a closing state; and the controller controls the opening of the pulse motor assembly when the mechanical switch unit is in an opening state.

7. The water outlet device according to claim 3, wherein the control unit further comprises a second valve in the housing, the second valve is arranged to the second pipeline, and is connected with the controller via signal for opening or closing the second pipeline;
   the second water outlet comprises an electric switch unit wirelessly connected with the controller, the controller controls opening or closing of the second valve according to a trigger signal of the electric switch unit.

8. The water outlet device according to claim 7, wherein the control unit further comprises a pulse motor assembly in the housing, the pulse motor assembly is arranged on the second pipeline, and is connected with the controller via signal for supplying pulse water to the second water outlet;

the controller controls opening or closing of the pulse motor assembly according to the trigger signal of the electric switch unit.

9. The water outlet device according to claim 7, wherein the electric switch unit comprises a wireless self-generating electric switch.

10. The water outlet device according to claim 3, wherein the control unit further comprises a first valve in the housing, the first valve is arranged to the first pipeline, and is connected with the controller via signal for opening or closing the first pipeline;

the first water outlet comprises a water outlet sensor, the water outlet sensor is connected with the controller via signal for acquiring a water outlet signal, and the controller is configured to control opening or closing of the first valve according to the water outlet signal.

11. The water outlet device according to claim 2, wherein the first water outlet comprises a thermostatic valve, and the thermostatic valve comprises a first water inlet opening, a second water inlet opening and a water outlet opening, the first water inlet opening is configured to be connected with a hot water pipe, the second water inlet opening is configured to be connected with a cold water pipe, one end of the water supply pipe is connected with the water outlet opening, and the other end of the water supply pipe is connected with the water inlet connector of the control unit.

12. The water outlet device according to claim 1, wherein the power supply comprises a battery electrically connected with the controller.

13. The water outlet device according to claim 12, wherein the battery comprises a rechargeable battery.

14. The water outlet device according to claim 1, wherein the first water outlet is a faucet; the second water outlet is a tooth flosser.

15. The water outlet device according to claim 1, wherein the water outlet device further comprises a second connecting pipe having one end connected to the second water outlet, and the other end connected to the control unit;

the first water outlet has a pull-out channel, and the second connecting pipe is arranged into the pull-out channel in a pulling-out manner.

16. The water outlet device according to claim 15, wherein the second connecting pipe above the worktable is hidden in the first water outlet and the second water outlet when the second water outlet is connected with the first water outlet.

17. The water outlet device according to claim 1, wherein the second water outlet is detachably connected with the first water outlet via magnetic connection or snap connection.

* * * * *